United States Patent
Mukherjee et al.

(10) Patent No.: US 10,827,528 B2
(45) Date of Patent: Nov. 3, 2020

(54) METHOD AND APPARATUSES FOR PROVIDING PARAMETER COORDINATION FOR BASE STATIONS AND WIRELESS DEVICES

(71) Applicant: Telefonaktiebolaget LM Ericsson (publ), Stockholm (SE)

(72) Inventors: Amitav Mukherjee, Fremont, CA (US); Kumar Balachandran, Pleasanton, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 65 days.

(21) Appl. No.: 16/305,678

(22) PCT Filed: May 31, 2017

(86) PCT No.: PCT/EP2017/063126
§ 371 (c)(1),
(2) Date: Nov. 29, 2018

(87) PCT Pub. No.: WO2017/207614
PCT Pub. Date: Dec. 7, 2017

(65) Prior Publication Data
US 2019/0327765 A1 Oct. 24, 2019

Related U.S. Application Data

(60) Provisional application No. 62/343,175, filed on May 31, 2016.

(51) Int. Cl.
*H04W 4/00* (2018.01)
*H04W 74/08* (2009.01)
(Continued)

(52) U.S. Cl.
CPC ....... *H04W 74/0816* (2013.01); *H04L 5/0048* (2013.01); *H04W 16/14* (2013.01); *H04W 84/042* (2013.01)

(58) Field of Classification Search
CPC .... H04L 5/0048; H04W 16/14; H04W 28/18; H04W 48/12; H04W 74/0816; H04W 84/042; H04W 88/12
See application file for complete search history.

(56) References Cited

U.S. PATENT DOCUMENTS

2015/0223069 A1 8/2015 Solondz
2016/0037352 A1* 2/2016 Wei .................. H04W 74/0833
455/454
2016/0226562 A1* 8/2016 Li .......................... H04B 7/024

FOREIGN PATENT DOCUMENTS

WO 2015000155 A1 1/2015
WO 2015022016 A1 2/2015
(Continued)

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.
(Continued)

*Primary Examiner* — Minh Trang T Nguyen
(74) *Attorney, Agent, or Firm* — Sage Patent Group

(57) ABSTRACT

An Authorized Shared Access (ASA) controller to provide parameter coordination for base stations and wireless devices operating on shared or adjacent channels and method of operation of same are provided. A method of operation of an ASA controller comprises configuring one or more parameters used by at least one base station and/or wireless device operating on shared or adjacent channels.
(Continued)

The one or more parameters comprise: a parameter related to timing of Downlink (DL) or Uplink (UL) transmissions by base stations and/or wireless devices; a parameter related to carrier aggregation; a parameter related to DL and/or UL transmissions within base stations sharing the same or adjacent frequency channels; a parameter related to different DL and/or UL reference signal parameters for different base stations; a random access channel parameter; and/or a parameter related to configuring System Information Block (SIB) and Master Information Block (MIB) parameters for adjacent base stations.

17 Claims, 11 Drawing Sheets

(51) Int. Cl.
  *H04L 5/00* (2006.01)
  *H04W 16/14* (2009.01)
  *H04W 84/04* (2009.01)

(56) References Cited

FOREIGN PATENT DOCUMENTS

WO 2015187282 A1 12/2015
WO 2015193294 A1 12/2015

OTHER PUBLICATIONS

Author Unknown, "3rd Generation Partnership Project; Technical Specification Group Radio Access Network; Evolved Universal Terrestrial Radio Access (E-UTRA); Multiplexing and channel coding (Release 12)," Technical Specification 36.212, Version 12.6.0, 3GPP Organizational Partners, Sep. 2015, 95 pages.

Author Unknown, "3rd Generation Partnership Project; Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.

Author Unknown, "3rd Generation Partnership Project; Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.

Shellhamm, S., "ASA (Authorized Shared Access )—A Novel Spectrum Policy Vision," Qualcomm, Internet Citation, Jun. 7, 2011, URL: "http://groups.winnforum.org/p/cm/Id/fid=181," retrieved Mar. 4, 2013, 12 pages.

International Search Report and Written Opinion for International Patent Application No. PCT/EP2017/063126, dated Sep. 7, 2017, 11 pages.

* cited by examiner

CCA = Clear Channel Assessment

METHOD AND APPARATUSES FOR PROVIDING PARAMETER COORDINATION FOR BASE STATIONS AND WIRELESS DEVICES

RELATED APPLICATIONS

This application is a 35 U.S.C. § 371 national phase filing of International Application No. PCT/EP2017/063126, filed May 31, 2017, which claims the benefit of provisional patent application Ser. No. 62/343,175, filed May 31, 2016, the disclosures of which are hereby incorporated herein by reference in their entireties.

TECHNICAL FIELD

The present disclosure relates Authorized Shared Access (ASA) and in particular to a coordination between a Spectrum Access System (SAS) and base stations, such as enhanced or evolved Node Bs (eNBs), operating wholly or partly in unlicensed bands.

BACKGROUND

Technical Background/Existing Technology

The Third Generation Partnership Project (3GPP) Release (Rel) 13 feature "Licensed-Assisted Access" (LAA) allows Long Term Evolution (LTE) equipment to also operate in the unlicensed 5 Gigahertz (GHz) radio spectrum. In LAA, the unlicensed 5 GHz spectrum is used as a complement to the licensed spectrum. An on-going 3GPP Rel-14 work item has added Uplink (UL) transmissions to LAA. Accordingly, devices connect in the licensed spectrum (Primary Cell (PCell)) and use Carrier Aggregation (CA) to benefit from additional transmission capacity in the unlicensed spectrum (Secondary Cell (SCell)).

Standalone LTE in unlicensed spectrum (i.e., MulteFire (MF)) is another version of unlicensed spectrum LTE and is currently under development in the MF Alliance Forum. In MF, the LTE is operating only in unlicensed bands.

In unlicensed bands, spectrum use is usually opportunistic. Recently, there has been interest in sharing using techniques such as Authorized Shared Access (ASA) or Licensed Shared Access (LSA). Such systems usually propose a division of rights of use, based on time of use or geographical constraints between mobile operators and an incumbent user. A typical use of this scenario is to enable use of a band that is available for licensed users in some markets, but is being restricted in others because of incumbents such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

An alternative method of spectrum sharing is defined for the Citizen Broadband Radio Service (CBRS) in the United States within the 3.5 GHz band. The CBRS defines three tiers of sharing, with higher tiers providing higher priority of access to spectrum than the lower ones. In general, multiple tiers of users can be defined, although three tiers are a pragmatic choice. The assignment of channels to different tiers and related configurations are performed by a geolocation database and policy management system known as the Spectrum Access System (SAS). In the CBRS, naval radar in littoral waters and commercial Fixed Satellite Service (FSS) compose the incumbents. The second tier consists of Priority Access Licenses (PALs), and the third tier comprises opportunistic users known as General Authorized Access (GAA) users. Incumbent radar activity in the CBRS is dynamic, while FSS (space-to-earth) is static. The SAS is charged with protecting incumbents and PALs. In addition, the SAS authorizes the authorization of spectrum to GAA users. MF is a candidate Radio Access Technology (RAT) for certain classes of devices in the 3.5 GHz band, possibly for lower power indoor use. Therefore, the SAS needs to configure different aspects of the channel access and transmission parameters of the MF-based Citizen Broadband Radio Service Devices (CBSDs), i.e., enhanced or evolved Node Bs (eNBs) and their associated User Equipment devices (UEs).

A conventional approach is disclosed in an International Patent Application, WO 2015/187282 A1, entitled "Methods And Apparatuses For Shared Spectrum Access," to Qualcomm Incorporated. Here, the SAS performs channel allocation to users in the second and third tiers, who then perform Listen-Before-Talk (LBT) to determine if the shared channels are clear for data transmission. In the MF Alliance Forum, it has been further discussed that the SAS may coordinate LBT parameters and discovery reference signal transmission parameters across MF eNBs that share channels.

LTE

LTE uses Orthogonal Frequency Division Multiplexing (OFDM) in the Downlink (DL) and Discrete Fourier Transform (DFT)-spread OFDM (also referred to as single-carrier Frequency Division Multiple Access (FDMA)) in the UL.

FIG. 1 shows a basic LTE DL physical resource, which can be seen as a time-frequency grid, where each resource element corresponds to one OFDM subcarrier during one OFDM symbol interval. The UL subframe has the same subcarrier spacing as the DL and the same number of Single Carrier FDMA (SC-FDMA) symbols in the time domain as OFDM symbols in the DL.

FIG. 2 shows an LTE radio frame. In the time domain, LTE DL transmissions are organized into radio frames of 10 milliseconds (ms), each radio frame consisting of ten equally-sized subframes of length $T_{SUBFRAME}=1$ ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 microseconds ($\mu$s).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

FIG. 3 shows an example LTE DL subframe in more detail. DL transmissions are dynamically scheduled, i.e., in each subframe the base station transmits control information about which terminals data is transmitted to and upon which resource blocks the data is transmitted, in the current DL subframe. This control signaling is typically transmitted in the first 1, 2, 3, or 4 OFDM symbols in each subframe and the number n=1, 2, 3, or 4 is known as the Control Format Indicator (CFI). The DL subframe also contains common reference symbols, which are known to the receiver and used for coherent demodulation of, e.g., the control information. A DL system with CFI=3 OFDM symbols as control is illustrated in FIG. 3. The reference symbols shown there are the Cell-Specific Reference Symbols (CRS) and are used to support multiple functions including fine time and frequency synchronization and channel estimation for certain transmission modes.

FIG. 4 shows an example LTE UL subframe in more detail. UL transmissions are dynamically scheduled, i.e., in each DL subframe the base station transmits control information about which terminals should transmit data to the eNB in subsequent subframes, and upon which resource blocks the data is transmitted. The UL resource grid is comprised of data and UL control information in the Physical UL Shared Channel (PUSCH), UL control information in the Physical UL Control Channel (PUCCH), and various reference signals such as Demodulation Reference Signals (DMRSs) and Sounding Reference Signals (SRSs). DMRSs are used for coherent demodulation of PUSCH and PUCCH data, whereas SRS is not associated with any data or control information but is generally used to estimate the UL channel quality for purposes of frequency-selective scheduling. An example UL subframe is shown in FIG. 4. Note that UL DMRS and SRS are time-multiplexed into the UL subframe, and SRSs are always transmitted in the last symbol of a normal UL subframe. The PUSCH DMRS is transmitted once every slot for subframes with normal cyclic prefix, and is located in the fourth and eleventh SC-FDMA symbols.

CA

FIG. 5 shows an example of CA. The LTE Rel-10 standard supports bandwidths larger than 20 Megahertz (MHz). One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least the possibility to have, the same structure as a Rel-8 carrier. A CA-capable UE is assigned a PCell which is always activated, and one or more SCells which may be activated or deactivated dynamically.

The number of aggregated CCs, as well as the bandwidth of the individual CC, may be different for UL and DL. A symmetric configuration refers to the case where the number of CCs in DL and UL is the same whereas an asymmetric configuration refers to the case that the number of CCs is different. It is important to note that the number of CCs configured in a cell may be different from the number of CCs seen by a terminal: a terminal may for example support more DL CCs than UL CCs, even though the cell is configured with the same number of UL and DL CCs.

LAA to Unlicensed Spectrum Using LTE

Up to now, the spectrum used by LTE is dedicated to LTE. This has the advantage that the LTE system does not need to care about the coexistence issue and the spectrum efficiency can be maximized. However, the spectrum allocated to LTE is limited and cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

FIG. 6 illustrates an example of LAA in an unlicensed spectrum using LTE. Furthermore, one way to utilize the unlicensed spectrum reliably is to transmit essential control signals and channels on a licensed carrier. That is, as shown in FIG. 6, a UE is connected to a PCell in the licensed band and one or more SCells in the unlicensed band. In this application an SCell in unlicensed spectrum is denoted as an LAA SCell. In the case of standalone operation as in MF, no licensed cell is available for UL control signal transmissions.

LBT in 3GPP LAA and MF

In Rel-13 LAA, LBT for DL data transmissions follow a random backoff procedure similar to that of Wi-Fi, with Contention Window (CW) adjustments based on Hybrid Automatic Repeat Request (HARQ) Negative Acknowledgement (NACK) feedback. Several aspects of UL LBT are under discussion in Rel-14. With regard to the framework of UL LBT, the discussion is focused on the self-scheduling and cross-carrier scheduling scenarios.

FIG. 7 illustrates the point that, when an UL grant is sent on an unlicensed carrier, UL LBT imposes an additional LBT step for UL transmissions with self-scheduling, since the UL grant itself requires a DL LBT by the eNB. This is shown in FIG. 7: in subframe n, the eNB in the unlicensed band performs a form of LBT, Clear Channel Assessment (CCA), to determine whether or not the channel is occupied (channel sensing). If the channel is available, then the eNB transmits an UL grant to the UE in the unlicensed band during subframe n. At subframe n+4, the UE may not simply assume that the UL channel is available even though the UE has received the UL grant, but must instead perform its own CCA as well. If the channel is in fact available then the UE may perform the UL transmission during subframe n+4.

The UL LBT maximum CW size should then be limited to a very low value to overcome this drawback if random backoff is adopted. Therefore, Rel-13 LAA recommended that the UL LBT for self-scheduling should use either a single CCA duration of at least 25 μs (similar to DL Discovery Reference Signal (DRS)), or a random backoff scheme with a defer period of 25 μs including a defer duration of 16 μs followed by one CCA slot, and a maximum CW size chosen from X={3, 4, 5, 6, 7}. These options are also applicable for cross-carrier scheduling of UL by another unlicensed SCell.

A short UL LBT procedure for the case involving cross-carrier scheduling by a licensed PCell remains open for further study in LAA. The other option supported in MF is a full-fledged random backoff procedure similar to that used by Wi-Fi Stations (STAs).

Finally, UL transmissions without LBT when a UL transmission burst follows a DL transmission burst on that respective carrier (with a gap of at most 16 µs between the two bursts) are allowed in Rel-14 LAA and MF.

SUMMARY

The present disclosure describes multiple embodiments regarding parameter coordination by a Spectrum Access System (SAS) for base stations, such as MulteFire (MF) enhanced or evolved Node Bs (eNBs), and for wireless devices, such as User Equipment devices (UEs), operating on shared or adjacent channels.

Apart from Listen-Before-Talk (LBT) and Discovery Reference Signal (DRS) parameters, there are numerous other Downlink (DL) and Uplink (UL) transmission parameters that can be configured by the SAS for use by standalone Long Term Evolution (LTE) in unlicensed spectrum (i.e., MF) eNBs and their associated UEs when operating on shared or adjacent channels. The present disclosure covers a number of such parameters. Examples of these parameters include transmission burst duration limits for the DL and UL, frame structures, reference signal configurations, random access parameters, and system information parameters.

The following advantages have been identified:
  Robust coexistence of multiple MF cells on a shared channel; and
  Efficient coordination of MF-based General Authorized Access (GAA) networks by a SAS.

According to one aspect of the present disclosure, a method of operation of an Authorized Shared Access (ASA) controller to provide parameter coordination for base stations and wireless devices operating on shared or adjacent channels, comprising configuring one or more parameters used by at least one base station and/or at least one wireless device operating on shared or adjacent channels, the one or more parameters comprising: parameters related to timing of DL transmissions by the at least one base station and/or timing of UL transmissions by the at least one wireless device; parameters related to Carrier Aggregation (CA); parameters related to DL and/or UL transmissions within base stations sharing the same or adjacent frequency channels; parameters related to different DL and/or UL reference signal parameters for different base stations; random access channel parameters; and/or parameters related to configuring System Information Block (SIB) and Master Information Block (MIB) parameters for adjacent base stations.

In one embodiment, the at least one base station comprises a LTE eNB, a standalone LTE in unlicensed spectrum (i.e., MF) eNB, and/or a License Assisted Access (LAA) eNB.

In one embodiment, the one or more parameters comprise one or more parameters related to timing of DL transmissions by the at least one base station and/or timing of UL transmissions by the at least one wireless device.

In one embodiment, the one or more parameters related to timing of DL transmissions by the at least one base station and/or timing of UL transmissions by the at least one wireless device comprise maximum durations of DL and UL transmission bursts that can be used by the at least one base station.

In one embodiment, the one or more parameters related to timing of DL transmissions by the at least one base station and/or timing of UL transmissions by the at least one wireless device further comprise a minimum backoff or idle period between consecutive transmission bursts from the at least one base station.

In one embodiment, the one or more parameters related to timing of DL transmissions by the at least one base station and/or timing of UL transmissions by the at least one wireless device further comprise a parameter related to the occurrence in time and/or time offsets of DL and/or UL transmissions.

In one embodiment, the one or more parameters related to timing of DL transmissions by the at least one base station and/or timing of UL transmissions by the at least one wireless device further comprise a parameter related to channel sensing.

In one embodiment, the parameter related to channel sensing comprises an assignment of a particular channel as performing LBT with full random backoff prior to transmission.

In one embodiment, the parameter related to channel sensing comprises an assignment of a particular channel as performing a Clear Channel Assessment (CCA) prior to transmission.

In one embodiment, the one or more parameters related to timing of DL transmissions by the at least one base station and/or timing of UL transmissions by the at least one wireless device comprise a set of Multicast-Broadcast Single Frequency Network (MBSFN) subframe configurations for the at least one base station.

In one embodiment, the one or more parameters related to timing of DL transmissions by the at least one base station and/or timing of UL transmissions by the at least one wireless device comprise an allocation of almost blank subframes for inter-cell time-domain interference coordination.

In one embodiment, the one or more parameters related to timing of DL transmissions by the at least one base station and/or timing of UL transmissions by the at least one wireless device comprise a restriction on subframes to be used for DL only.

In one embodiment, the one or more parameters related to timing of DL transmissions by the at least one base station and/or timing of UL transmissions by the at least one wireless device comprise a restriction on subframes to be used for UL only.

In one embodiment, the one or more parameters related to timing of DL transmissions by the at least one base station and/or timing of UL transmissions by the at least one wireless device comprise a restriction on subframes to be unused.

In one embodiment, the one or more parameters comprise one or more parameters related to CA.

In one embodiment, the one or more parameters related to CA comprise a maximum number of simultaneously activated DL Component Carriers (CCs) that the at least one base station can use when adopting DL CA in an unlicensed frequency spectrum.

In one embodiment, the one or more parameters related to CA comprise a maximum number of simultaneously activated UL CCs that the at least one wireless device can use when adopting UL CA in an unlicensed frequency spectrum.

In one embodiment, the one or more parameters related to CA comprise one or more parameters that configure whether the at least one base station and/or the at least one wireless device is allowed to dynamically vary their transmit power allocation across CCs that are available for transmission after LBT.

In one embodiment, the one or more parameters related to CA comprise one or more parameters that configure a degree to which the at least one base station and/or the at least one wireless device is allowed to dynamically vary their transmit power allocation across CCs that are available for transmission after LBT.

In one embodiment, the one or more parameters related to CA comprise one or more parameters that configure a maximum allowed UL transmit power on each serving cell when transmitting simultaneous Physical UL Shared Channel (PUSCH) and Physical UL Control Channel (PUCCH) or simultaneous PUSCH on multiple UL CCs.

In one embodiment, the one or more parameters related to CA comprise one or more parameters related to schedules for changing UL and DL configurations in a certain CC or CCs.

In one embodiment, the one or more parameters related to CA comprise one or more parameters related to mobility and base station association for different CCs.

In one embodiment, the one or more parameters related to CA comprise one or more parameters related to configuring cell range expansion offsets for different cells.

In one embodiment, the one or more parameters related to CA comprise one or more cell association parameters.

In one embodiment, the one or more parameters comprise one or more different parameters related to DL or UL transmissions within base stations sharing the same or adjacent frequency channels.

In one embodiment, the one or more parameters comprise one or more different DL or UL reference signal parameters for different base stations.

In one embodiment, the one or more parameters define one or more non-overlapping sets of reference signals.

In one embodiment, the one or more overlapping sets of reference signals comprise: Demodulation Reference Signal (DMRS) sequence groups; Channel State Information Reference Signal (CSI-RS) configurations; different time and/or frequency offsets and/or periodicities Cell-Specific Reference Signals (CRSs) and/or Positioning Reference Signals (PRSs); and/or different time locations and/or multiplexing configurations for UL Sounding Reference Signals (SRSs).

In one embodiment, the one or more parameters comprise one or more random access channel parameters.

In one embodiment, the one or more random access channel parameters comprise non-overlapping sets of Physical Random Access Channel (PRACH) configurations.

In one embodiment, the PRACH configurations comprise: parameters relating to periodicities and valid subframes; parameters relating to frequency offsets for PRACH resources within a subframe; and/or parameters allocating non-overlapping sets of PRACH preamble sequences.

In one embodiment, the one or more parameters comprise one or more parameters related to configuring SIB and/or MIB parameters for adjacent base stations.

In one embodiment, the one or more parameters related to configuring SIB and/or MIB parameters for adjacent base stations comprise: different System Frame Number (SFN) periodicities and/or offsets for the subframes valid for transmission of MIB and/or SIBs; physical cell identities; and/or timing and resource allocation for DL preamble signals.

According to another aspect of the present disclosure, an ASA controller to provide parameter coordination for base stations and wireless devices operating on shared or adjacent channels is adapted to: configure one or more parameters used by at least one base station and/or at least one wireless device operating on shared or adjacent channels, the one or more parameters comprising: parameters related to timing of DL transmissions by the at least one base station and/or timing of UL transmissions by the at least one wireless device; parameters related to CA; parameters related to DL and/or UL transmissions within base stations sharing the same or adjacent frequency channels; parameters related to different DL and/or UL reference signal parameters for different base stations; random access channel parameters; and/or parameters related to configuring SIB and MIB parameters for adjacent base stations.

In one embodiment, the ASA controller is further adapted to perform any of the methods disclosed herein.

According to another aspect, an ASA controller to provide parameter coordination for base stations and wireless devices operating on shared or adjacent channels comprises: at least one network interface; at least one processor; and memory storing instructions executable by the at least one processor whereby the ASA controller is operable to configure one or more parameters used by at least one base station and/or at least one wireless device operating on shared or adjacent channels, the one or more parameters comprising: parameters related to timing of DL transmissions by the at least one base station and/or timing of UL transmissions by the at least one wireless device; parameters related to CA; parameters related to DL and/or UL transmissions within base stations sharing the same or adjacent frequency channels; parameters related to different DL and/or UL reference signal parameters for different base stations; random access channel parameters; and/or parameters related to configuring SIB and MIB parameters for adjacent base stations.

According to another aspect, an ASA controller to provide parameter coordination for base stations and wireless devices operating on shared or adjacent channels comprises: a configuration module operable to configure one or more parameters used by at least one base station and/or at least one wireless device operating on shared or adjacent channels, the one or more parameters comprising: parameters related to timing of DL transmissions by the at least one base station and/or timing of UL transmissions by the at least one wireless device; parameters related to CA; parameters related to DL and/or UL transmissions within base stations sharing the same or adjacent frequency channels; parameters related to different DL and/or UL reference signal parameters for different base stations; random access channel parameters; and/or parameters related to configuring SIB and MIB parameters for adjacent base stations.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
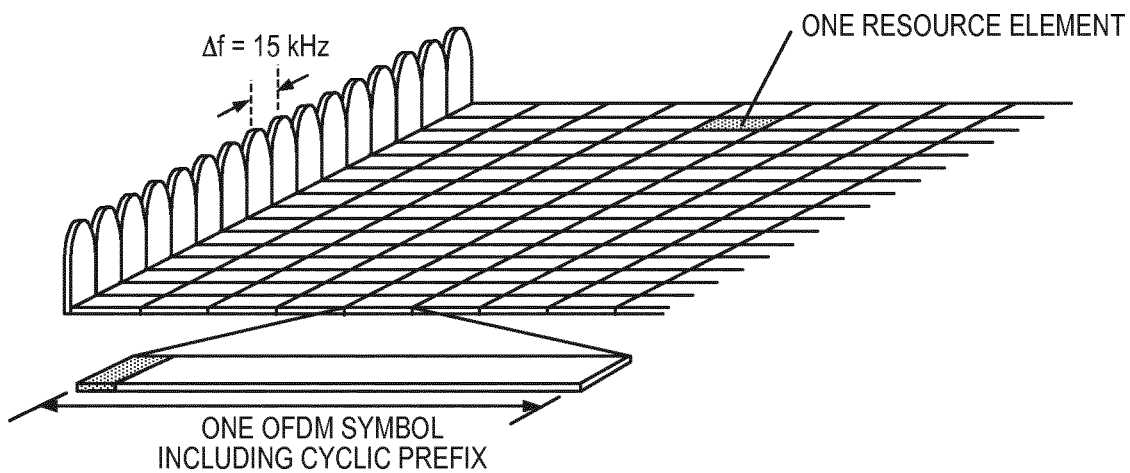
FIG. 1 illustrates a time-frequency grid that shows a basic Long Term Evolution (LTE) Downlink (DL) physical resource.
Figure 2:
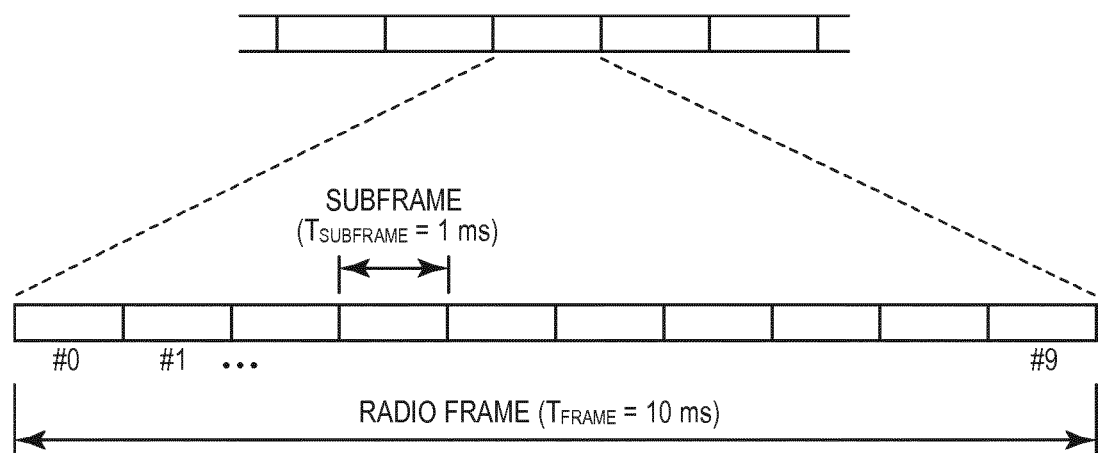
FIG. 2 illustrates a radio frame structure of LTE DL transmissions.
Figure 3:
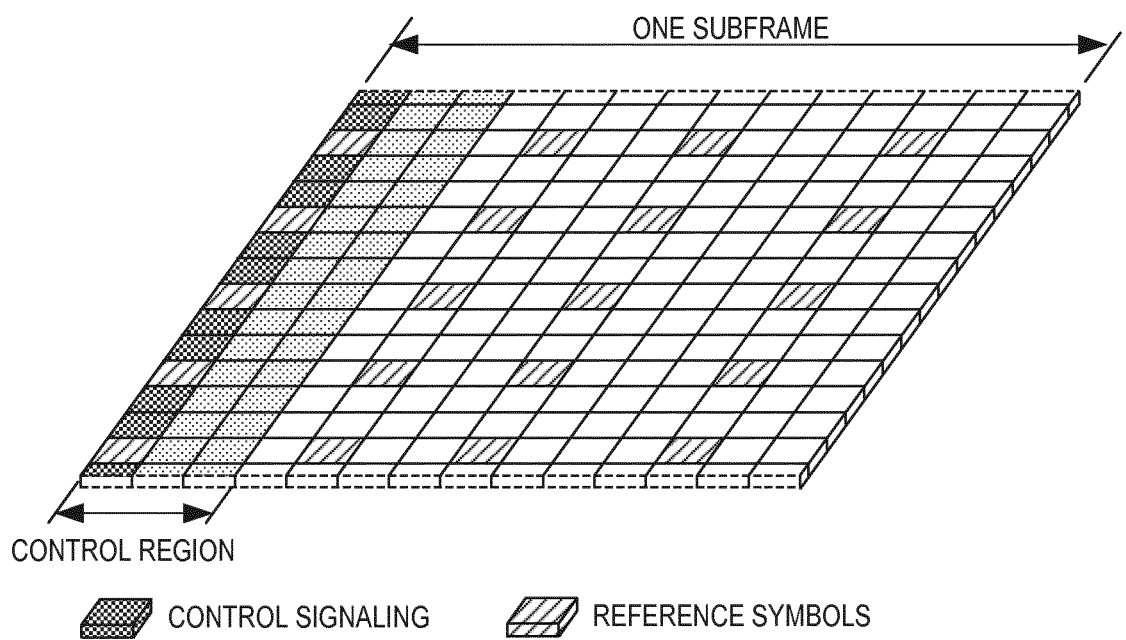
FIG. 3 illustrates an LTE DL system with Control Format Indicator (CFI)=3 Orthogonal Frequency Division Multiplexing (OFDM) symbols as control.
Figure 4:
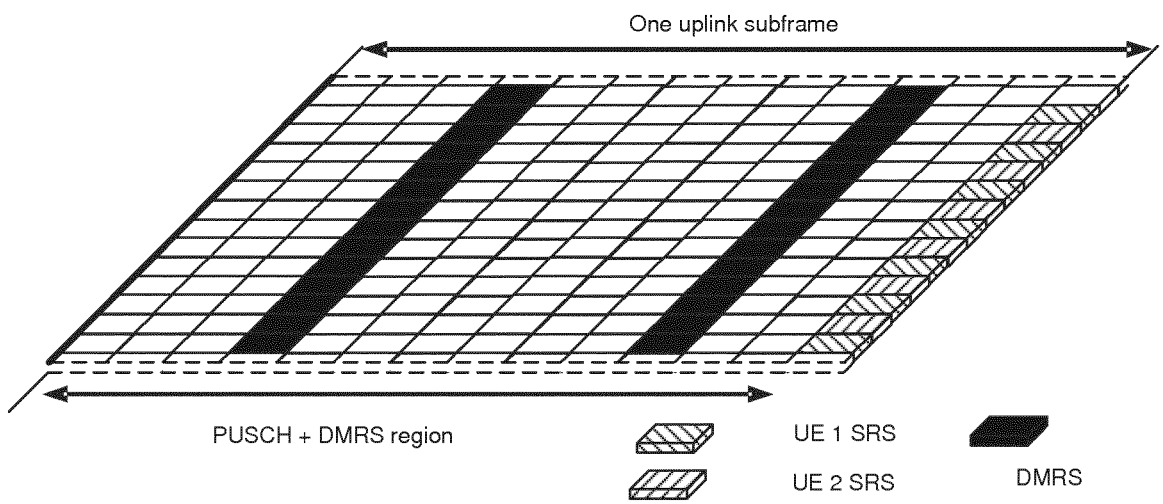
FIG. 4 illustrates an example LTE Uplink (UL) subframe.
Figure 5:
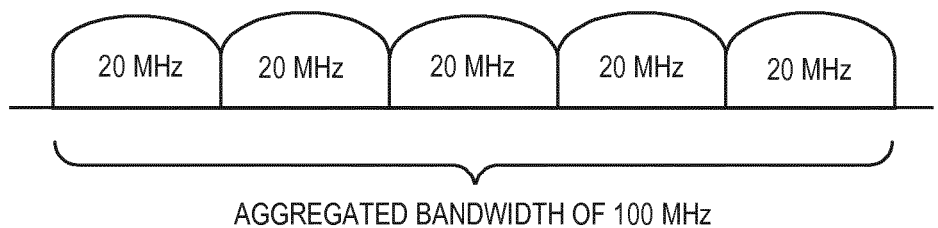
FIG. 5 illustrates Carrier Aggregation (CA)
Figure 6:
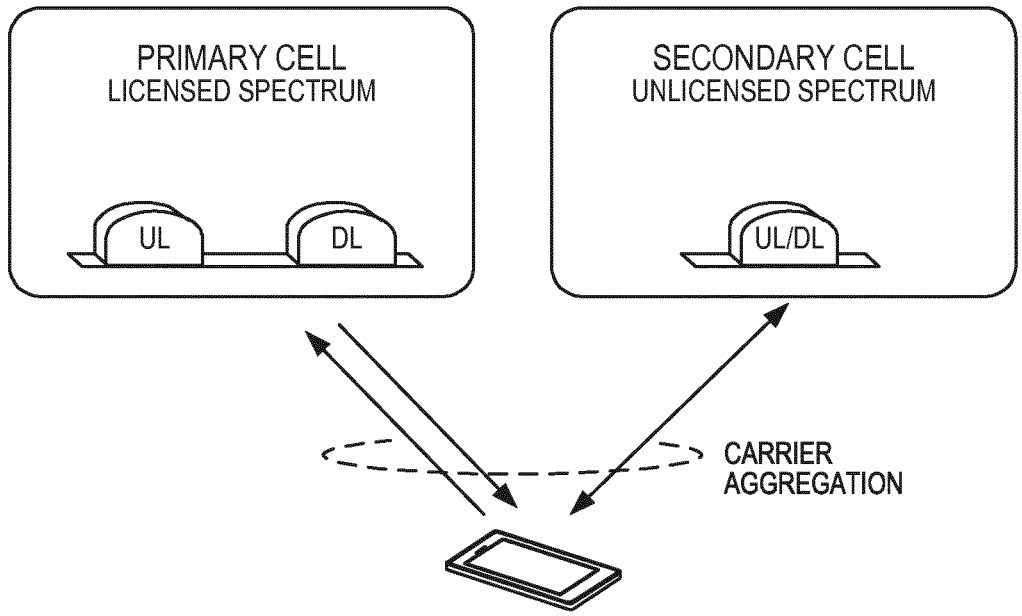
FIG. 6 illustrates an example of Licensed Assisted Access (LAA) to an unlicensed spectrum using LTE.
Figure 7:
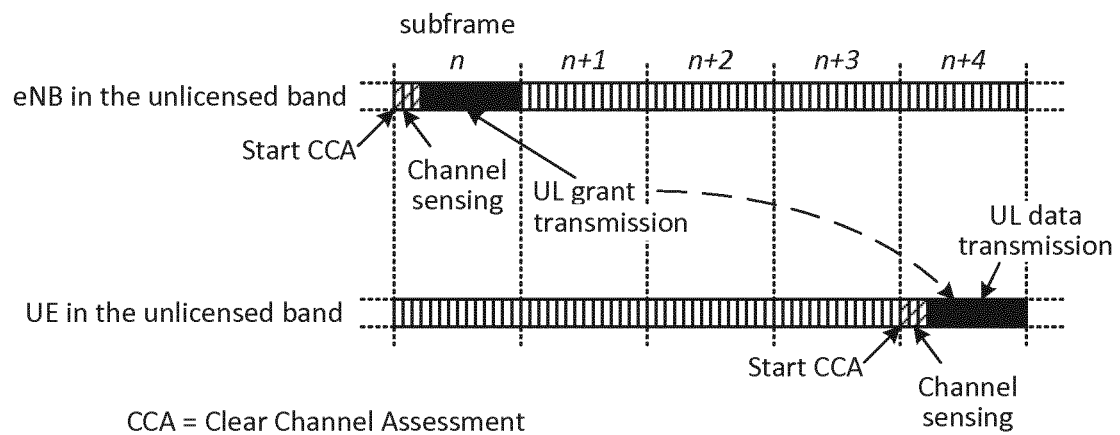
FIG. 7 illustrates one example of UL Listen-Before-Talk (LBT) and UL transmission when a UL grant is sent on an unlicensed carrier.

The present disclosure describes multiple embodiments regarding parameter coordination by a Spectrum Access System (SAS) for Third Generation Partnership Project (3GPP) Long Term Evolution (LTE) enhanced or evolved eNodeBs (eNBs) and User Equipment devices (UEs) operating on shared or adjacent channels. Examples of these parameters include transmission burst duration limits for the Downlink (DL) and Uplink (UL), frame structures, reference signal configurations, random access parameters, and system information parameters.

Channel selections and related parameter configurations may be sent directly from the SAS to one or more standalone LTE in unlicensed spectrum (i.e., MulteFire (MF)) eNBs over a logical interface, or may be sent to an intermediary logical controller or domain proxy that is connected with one or more MF eNBs. The parameter configurations that are determined at the SAS may be based upon measurement reports obtained from one or more Citizen Broadband Radio Service Devices (CBSDs), where the measurement reports may consist of Received Signal Strength Indicator (RSSI), Reference Signal Received Power (RSRP), Reference Signal Received Quality (RSRQ), or other metrics related to ambient interference levels.

It is noted that the following embodiments are applicable to standalone LTE in unlicensed spectrum (i.e., MF) or License Assisted Access (LAA) or other LTE versions based on Time Division Duplexing (TDD) or enhanced Interference Mitigation and Traffic Adaptation (eIMTA) when deployed in a general Authorized Shared Access (ASA) system and coordinated by one or more ASA controllers (e.g., SAS controllers). The parameter configurations performed by a SAS are generally on a longer time scale compared to the actual transmission time intervals of MF, and transmissions may be conditioned on successful Listen-Before-Talk (LBT).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an eNB in an LTE network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a CN node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). The terms "wireless device" and "UE" are used interchangeably herein. Some examples of a wireless device include, but are not limited to, a LTE UE in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell"; however, particularly with respect to Fifth Generation (5G) concepts, beams may be used instead of cells and, as such, it is important to note that the concepts described herein are equally applicable to both cells and beams.

Figure 8:
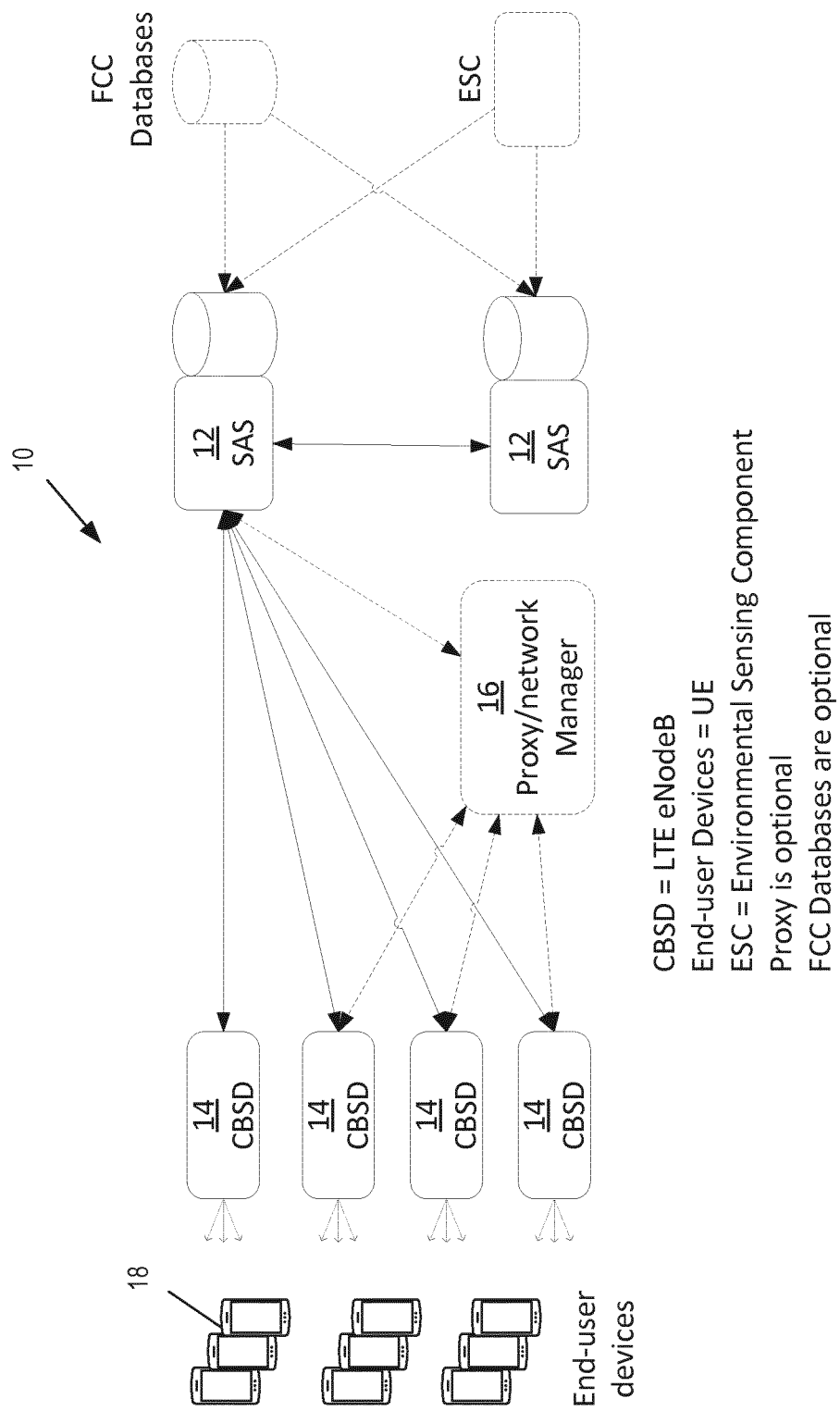
FIG. 8 illustrates an example Citizen Broadband Radio Service (CBRS) in which embodiments of the present disclosure may be implemented.

FIG. 8 illustrates an example Citizen Broadband Radio Service (CBRS) in which embodiments of the present disclosure may be implemented. In the embodiment illustrated in FIG. 8, a system 10 includes multiple SASs 12. In this example, one SAS 12 interfaces to multiple CBSDs 14 directly and/or interfaces to multiple CBSDs 14 via a domain proxy/network manager 16. The SASs 12 are more generally referred to herein as ASA controllers 12. Each SAS 12 is implemented as hardware or a combination of hardware and software. For example, the SAS 12 may include one or more processors (e.g., Central Processing Units (CPUs), Application Specific Integrated Circuits (ASICs), Field Programmable Gate Arrays (FPGAs), and/or the like), memory, and a network interface(s). The CBSDs 14 are, in this example, LTE eNBs (e.g., eNBs in a LAA deployment of a LTE network or a MF deployment of an LTE network in which the eNB serves a cell, e.g., operating on a carrier(s) in an unlicensed spectrum). Thus, the CBSDs 14 are sometimes referred to herein as eNBs 14, LTE eNBs 14, or MF eNBs 14. The CBSDs 14 serve end-user devices 18, which in this example are UEs. As such, the end-user devices 18 are sometimes referred to herein as UEs 18. In one embodiment, the system 10 may optionally include an Environmental Sensing Component (ESC), which detects and communicates the presence of a signal from an incumbent user to an SAS 12 to facilitate shared spectrum access. In one embodiment, the system 10 may optionally include Federal Communications Commission (FCC) Databases, which are system-wide accessible databases that allow the look-up of a PAL boundary and PAL ownership based upon the PAL-ID.

Figure 9:
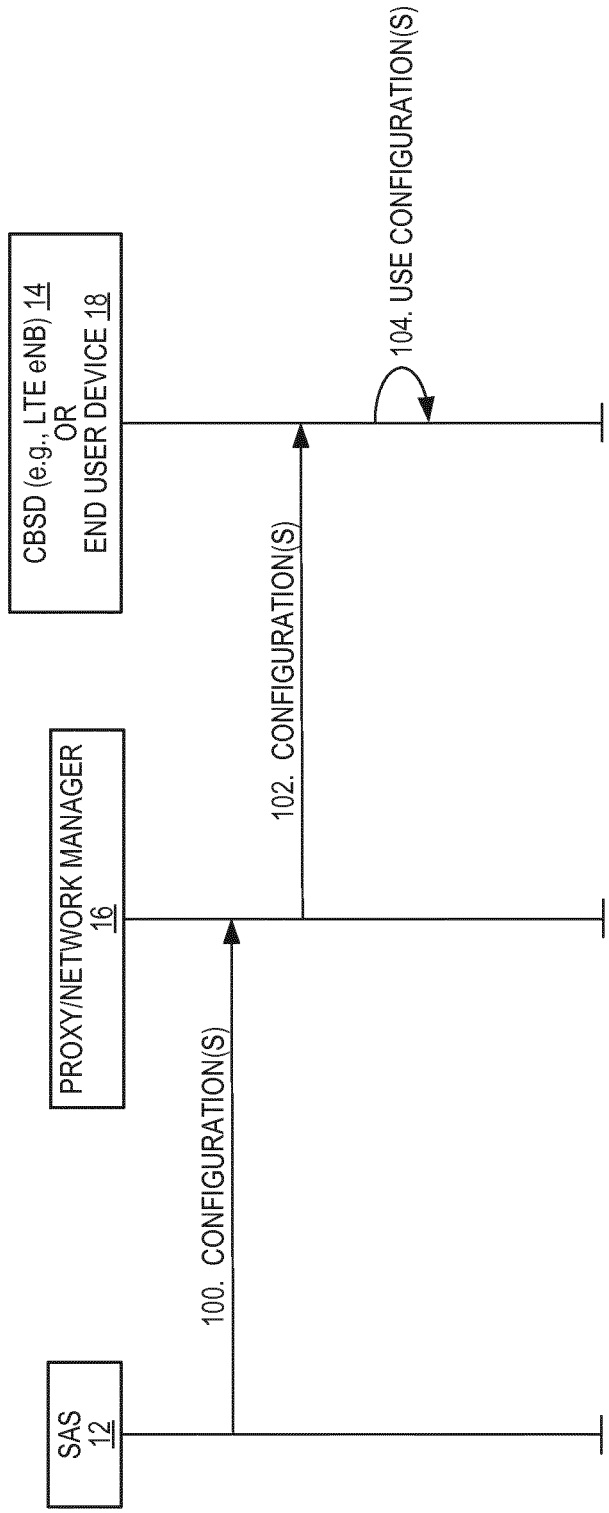
FIGS. 9 and 10 illustrate the operation of an Authorized Shared Access (ASA) controller (e.g., a Spectrum Access System (SAS)) according to some embodiments of the present disclosure.

FIG. 9 illustrates the operation of an ASA controller (e.g., a SAS) according to an embodiment of the present disclosure. In the embodiment illustrated in FIG. 9, the SAS 12 configures the CBSD(s) 14 (e.g., LTE eNB(s) such as, for example, MF eNB(s)) and/or configures the end-user device(s) 18 (e.g., UE(s)) via the proxy/network manager 16 (steps 100 and 102). As illustrated, the SAS 12 sends one or more configurations to the proxy/network manager 16 (step 100). The one or more configurations include one or more configurations for the CBSD(s) 14 and/or one or more configurations for the end-user device(s) 18. The proxy/network manager 16 then sends the one or more configurations to the CBSD(s) 14 and/or the end-user device(s) 18 (e.g., UE(s)), depending on the embodiment (step 102). The CBSD(s) 14 and/or the end-user device(s) 18 then use the configuration(s) (step 104).

Figure 10:
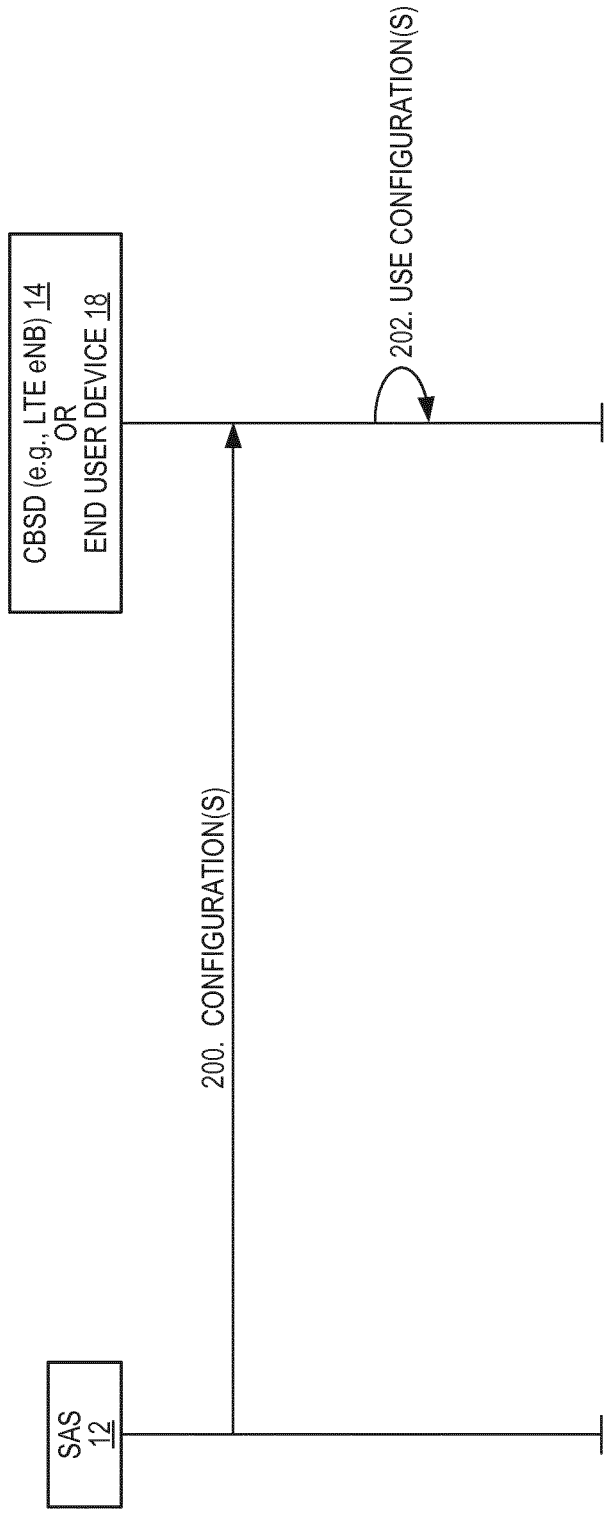

FIG. 10 illustrates the operation of an ASA/SAS according to another embodiment of the present disclosure. In the embodiment illustrated in FIG. 10, the SAS 12 configures the CBSD(s) 14 (e.g., LTE eNB(s) such as, for example, MF eNB(s)) and/or configures the end-user device(s) 18 (e.g., UE(s)) directly. In the embodiment illustrated in FIG. 10, the SAS 12 sends one or more configurations to the CBSD(s) 14 and/or the end-user device(s) 18 (e.g., UE(s)), depending on the embodiment (step 200). The CBSD(s) 14 and/or the end-user device(s) 18 then use the configuration(s) (step 202).

The following embodiments are related to the one or more configurations configured by the SAS 12, e.g., in steps 100-102 and 200 of FIGS. 9 and 10, respectively.

Embodiment 1

In the first embodiment, the SAS 12 configures various aspects related to the occurrence in time and time offsets of DL and UL transmissions.

In one aspect of this embodiment, the SAS 12 configures the maximum durations of DL and UL transmission bursts that can be used by the MF eNBs 14, where a transmission burst denotes a set of contiguous subframes. These durations may be associated either explicitly or implicitly with other LBT parameters such as energy detection thresholds and Contention Window (CW) sizes, or may be independent of any LBT mechanisms. Separate maximum burst durations may be configured for the DL and UL on one or more shared channels. The SAS 12 may also configure a minimum backoff or idle period between consecutive transmission bursts from the MF eNB 14, and may assign a particular channel on which LBT with full random backoff is performed while on other assigned channel(s) only a short CCA is performed prior to transmission. By controlling the maximum burst durations, the SAS 12 can enforce improved time sharing of the operating channel and prevent CBSDs 14 from monopolizing the medium.

In a second aspect, the SAS 12 defines a set of Multicast-Broadcast Single Frequency Network (MBSFN) subframe configurations for the MF eNBs 14. In Release (Rel) 13 LAA, up to eight out of ten subframes within a frame (excluding subframe 0 and 5) can be configured as MBSFN subframes. The configuration of certain subframes as MBSFN reduces the Cell-Specific Reference Symbol (CRS) interference caused to adjacent CBSDs. In a related aspect, the SAS 12 may further configure the allocation of Almost Blank Subframes (ABSs) for inter-cell time-domain interference coordination. In another related aspect, the SAS 12 may restrict certain periodic subframes to be used for either DL-only or UL-only transmissions, or be restricted to be left entirely unused. For example, the introduction of a CBSD-specific blank frame that is coincident in time with a DL-only frame from other CBSDs will provide the first CBSD with information about the nearest interferers. Introduction of a CBSD-specific black frame with periodic UL-only frames in other cells allows the first CBSD to gauge the level of interference faced by end-user devices in its serving area.

Embodiment 2

In a second embodiment, the SAS 12 configures various Carrier Aggregation (CA)-related parameters for DL and UL transmissions and associations with different Component Carriers (CCs).

In one aspect of this embodiment, the SAS 12 configures the maximum number of simultaneously activated CCs that an eNB 14 can use on either the DL or its served UEs 18 on the UL when adopting CA within the 3.5 gigahertz (GHz) band. The SAS 12 may further configure if eNBs 14 or their associated UEs 18 are allowed to dynamically vary their transmit power allocation across the CCs that are available for transmission after LBT, and to what degree such variation may occur (in decibels (dB) or decibel-milliwatts (dBm)). The SAS 12 may further configure the maximum allowed UL transmit power on each serving cell when transmitting simultaneous Physical UL Shared Channel (PUSCH) and Physical UL Control Channel (PUCCH) or simultaneous PUSCH on multiple UL CCs.

In a second aspect, the SAS 12 may determine schedules for changing UL and DL configurations in a certain CC or CCs, so that dynamic local coordination of the radio of UL to DL bandwidth may be performed. The determination of the schedules may be based upon the principle of minimizing cross-link interference scenarios, i.e., avoiding cases where the UL transmissions of one CBSD cell interfere with the DL reception of UEs in another cell.

In a third aspect, the SAS 12 may configure parameters related to mobility and MF cell association for different CCs. In one example, the SAS configures the thresholds related to different intra-frequency and inter-frequency mobility measurement events which are triggered when a neighbor cell or Radio Access Technology (RAT) becomes better than the serving cell. In another example, the SAS 12 configures cell range expansion offsets for different MF cells. By controlling the cell association parameters, the SAS 12 can bias the association of UEs 18 towards one or more preferred serving cells. For example, the preferred serving cells may be physically located outside of an interference radius with respect to one or more Priority Access License (PAL) users, thereby guaranteeing a certain level of interference protection for the PAL users.

Embodiment 3

In a third embodiment, the SAS 12 may partition different parameters related to DL or UL transmissions within CBSDs 14 sharing the same or adjacent frequency channels. The motivation is to minimize the overlap of transmissions with identical or similar parameters from co-channel CBSDs 14 and their associated UEs 18, which reduces the false alarm and incorrect detection rates.

In the first aspect of this embodiment, the SAS 12 configures different CBSDs 14 with different DL or UL reference signal parameters. In one non-limiting example, non-overlapping sets of Demodulation Reference Signal (DMRS) sequence groups are assigned to adjacent eNBs 14 on the same channel, and the eNBs 14 can choose any configuration within their particular assigned set. In a second example, non-overlapping sets of Channel State Information Reference Signal (CSI-RS) configurations are assigned to adjacent eNBs 14. In a third example, different time/frequency offsets and/or periodicities are allocated for DL reference signals such as CRSs and Positioning Reference Signals (PRSs). In a fourth example, different time locations and/or multiplexing configurations such as frequency combs are allocated for UL Sounding Reference Signals (SRSs). Such techniques in combination with the second embodiment are a way for the CBSD 14 to differentiate between different cells in the deployment.

In a second aspect of this embodiment, the SAS 12 configures random access channel parameters so as to minimize Physical Random Access Channel (PRACH) preamble collisions between adjacent cells. In one example, non-overlapping sets of PRACH configurations (periodicities and valid subframes) are allocated to adjacent eNBs 14, and the eNBs 14 can choose any configuration within their particular assigned set. In another example, the SAS 12 allocates to each eNB 14 a particular set of frequency offsets for PRACH resources within a subframe. In a third example, the SAS 12 allocates non-overlapping sets of PRACH preamble sequences to multiple eNBs 14. By doing so, the missed detection probability and cross-detection probability of an incorrect PRACH preamble sequence can be reduced, which in turn reduces the delay in the initial access procedure.

In a third aspect of this embodiment, the SAS 12 configures system information and Master Information Block (MIB) parameters for adjacent eNBs 14. In one example, the SAS 12 configures different System Frame Number (SFN) periodicities or offsets for the subframes valid for transmission of MIB and one or more System Information Block (SIBs). In another example, the SAS 12 configures the physical cell identity used by one or more cells. In a third example, the SAS 12 configures the timing and resource allocation of MF DL preamble signals. The motivation here is to avoid overlapping transmissions of critical system information and preamble signals from different cells, such that receiving UEs 18 perceive lower interference when decoding such signals.

SAS and UE Block Diagrams

Figure 11:
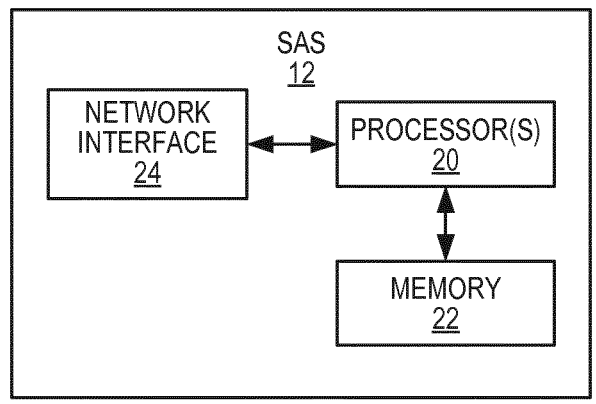
FIGS. 11 and 12 are block diagrams of example embodiments of a SAS.

FIG. 11 illustrates a schematic block diagram of the SAS 12 according to some embodiments of the present disclosure. As illustrated, the SAS 12 includes one or more processors 20 (e.g., CPUs, ASICs, FPGAs, and/or the like), memory 22, and a network interface 24. The one or more processors 20 operate to provide one or more functions of the SAS 12 as described herein. In some embodiments, the function(s) are implemented in software that is stored, e.g., in the memory 22 and executed by the one or more processors 20.

In some embodiments, a computer program including instructions which, when executed by at least one processor 20, causes the at least one processor 20 to carry out the functionality of the SAS 12 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
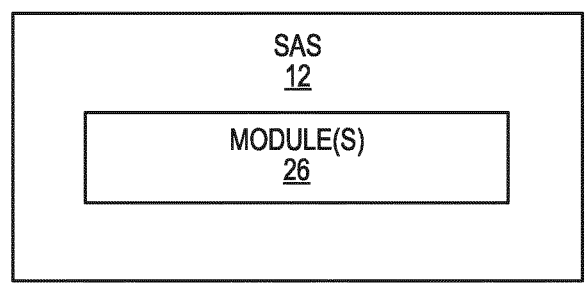

FIG. 12 illustrates a schematic block diagram of the SAS 12 according to some other embodiments of the present disclosure. The SAS 12 includes one or more modules 26, each of which is implemented in software. The module(s) 26 provide the functionality of the SAS 12 described herein. For example, the module(s) 26 may include a configuration module that operates to provide the functionality of the SAS 12 according to, e.g. FIGS. 9 and 10 and/or embodiments one, two, and/or three described above.

Figure 13:
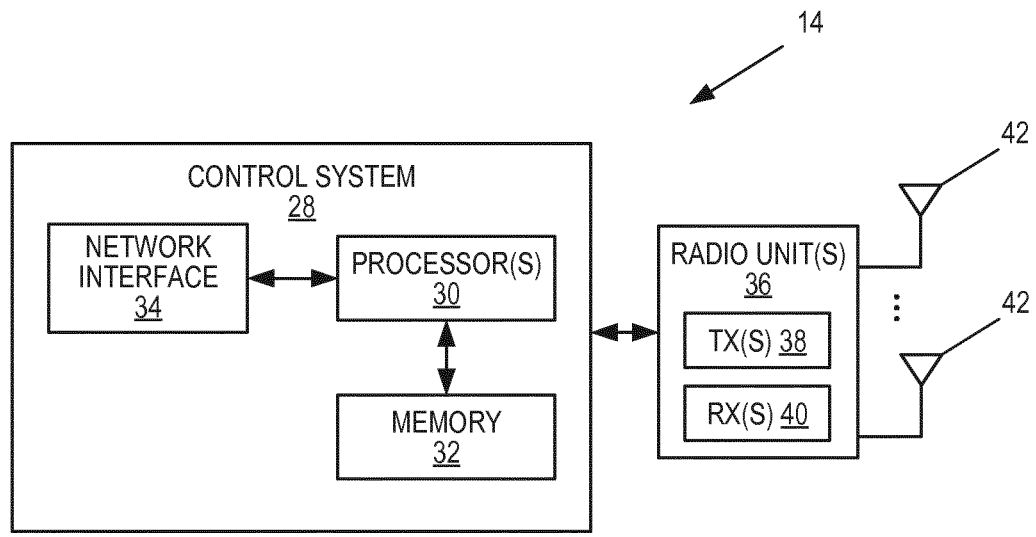
FIGS. 13 through 15 are block diagrams of example embodiments of a LTE enhanced or evolved Node B (eNB)

FIG. 13 illustrates a schematic block diagram of an LTE eNB 14 according to some embodiments of the present disclosure. However, this discussion is equally applicable more generally to base stations or radio access nodes in a cellular communications network. As illustrated, the eNB 14 includes a control system 28 that includes one or more processors 30 (e.g., CPUs, ASICs, FPGAs, and/or the like), memory 32, and a network interface 34 as well as one or more radio units 36 that each includes one or more transmitters 38 and one or more receivers 40 coupled to one or more antennas 42. In some embodiments, the radio unit(s) 36 is external to the control system 28 and is connected to the control system 28 via, e.g., a wired connection (e.g., an optical cable). However, in some other embodiments, the radio unit(s) 36 and potentially the antenna(s) 42 are integrated together with the control system 28. The one or more processors 30 operate to provide one or more functions of a network node as described herein. In some embodiments, the function(s) are implemented in software that is stored, e.g., in the memory 32 and executed by the one or more processors 30.

Figure 14:
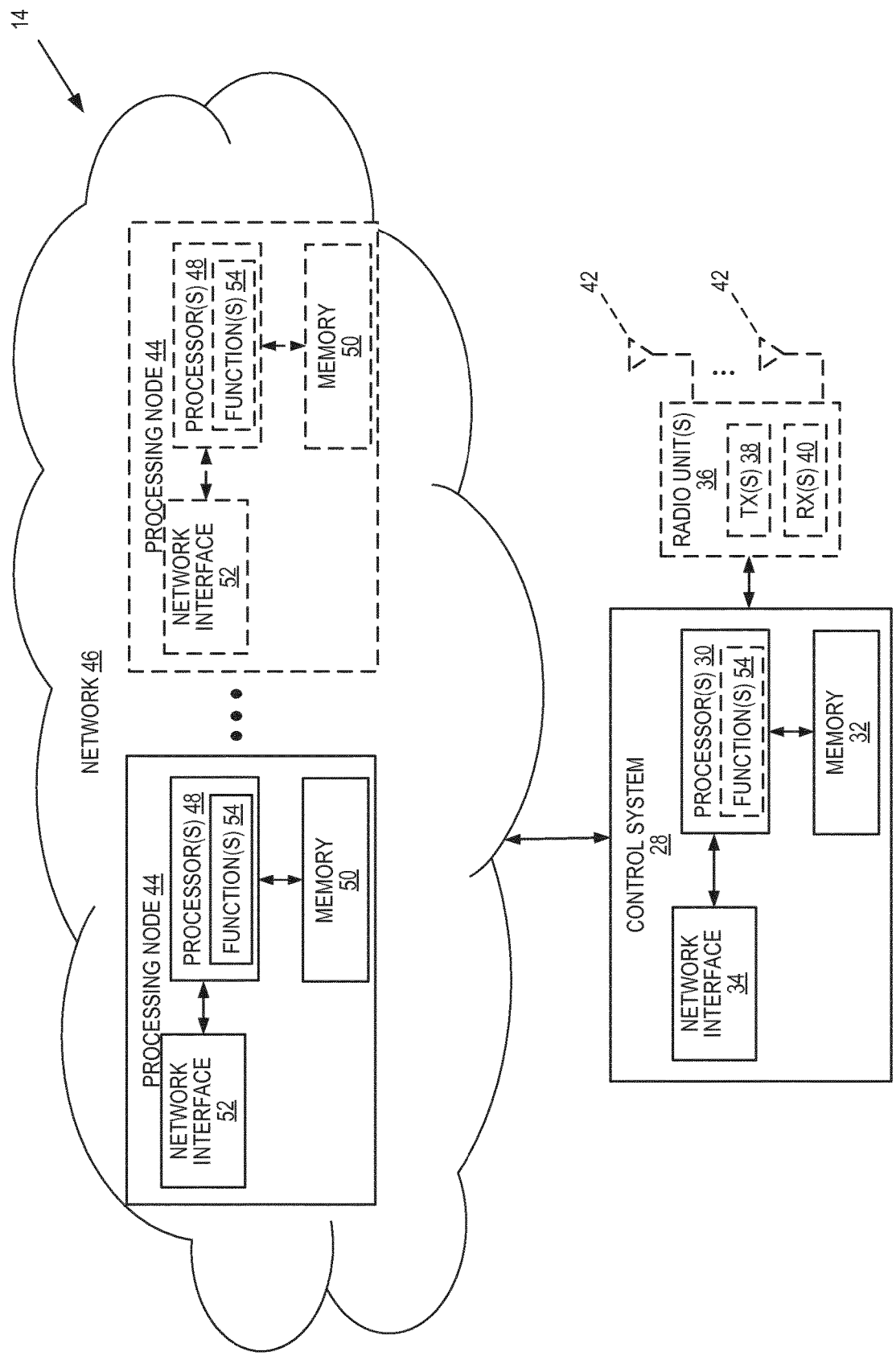

FIG. 14 illustrates a schematic block diagram that illustrates a virtualized embodiment of the eNB 14 according to some embodiments of the present disclosure. This discussion is equally applicable to other types of radio access nodes. Further, other types of network nodes may have similar virtualized architectures.

As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). As illustrated, in this example, the eNB 14 includes the control system 28 that includes the one or more processors 30 (e.g., CPUs, ASICs, FPGAs, and/or the like), the memory 32, the network interface 34 and, depending on the type of network node, the one or more radio units 36 that each includes the one or more transmitters 38 and the one or more receivers 40 coupled to the one or more antennas 42, as described above. The control system 28 is connected to the radio unit(s) 36 via, for example, an optical cable or the like. The control system 28 is connected to one or more processing nodes 44 coupled to or included as part of a network(s) 46 via the network interface 34. Each processing node 44 includes one or more processors 48 (e.g., CPUs, ASICs, FPGAs, and/or the like), memory 50, and a network interface 52.

In this example, functions 54 of the eNB 14 described herein are implemented at the one or more processing nodes 44 or distributed across the control system 28 and the one or more processing nodes 44 in any desired manner. In some particular embodiments, some or all of the functions 54 of the network node described herein are implemented as virtual components executed by one or more virtual machines implemented in a virtual environment(s) hosted by the processing node(s) 44. As will be appreciated by one of ordinary skill in the art, additional signaling or communication between the processing node(s) 44 and the control system 28 is used in order to carry out at least some of the desired functions 54. Notably, in some embodiments, the control system 28 may not be included, in which case the radio unit(s) 36 communicate directly with the processing node(s) 44 via an appropriate network interface(s).

In some embodiments, a computer program including instructions which, when executed by at least one processor, causes the at least one processor to carry out the functionality of the eNB 14 or a node (e.g., a processing node 44) implementing one or more of the functions 54 of the eNB 14 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
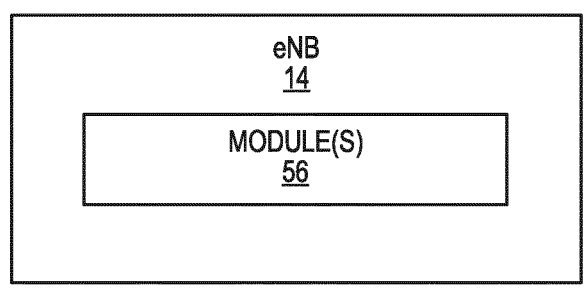

FIG. 15 illustrates a schematic block diagram of the eNB 14 according to some other embodiments of the present disclosure. The eNB 14 includes one or more modules 56, each of which is implemented in software. The module(s) 56 provide the functionality of the eNB 14 described herein.

Figure 16:
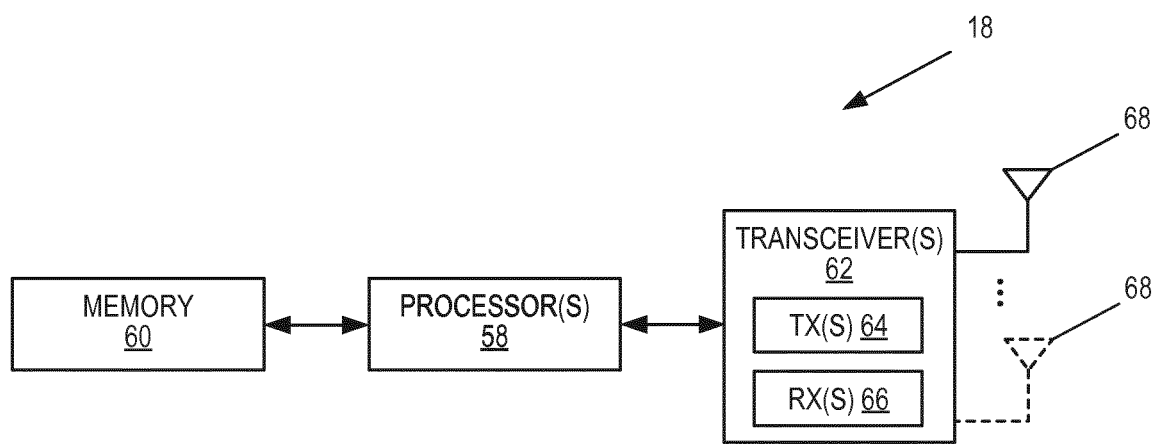
FIGS. 16 and 17 are block diagrams of example embodiments of a User Equipment device (UE).

FIG. 16 illustrates a schematic block diagram of the UE 18 according to some embodiments of the present disclosure. As illustrated, the UE 18 includes one or more processors 58 (e.g., CPUs, ASICs, FPGAs, and/or the like), memory 60, and one or more transceivers 62 each including one or more transmitters 64 and one or more receivers 66 coupled to one or more antennas 68. In some embodiments, the functionality of the UE 18 described above may be fully or partially implemented in software that is, e.g., stored in the memory 60 and executed by the processor(s) 58.

In some embodiments, a computer program including instructions which, when executed by at least one processor, causes the at least one processor 58 to carry out the functionality of the UE 18 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
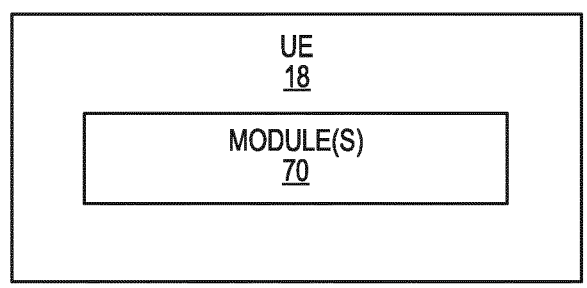

FIG. 17 illustrates a schematic block diagram of the UE 18 according to some other embodiments of the present disclosure. The UE 18 includes one or more modules 70, each of which is implemented in software, that operate to provide the functionality of the UE 18 described herein.

The following acronyms are used throughout this disclosure.

μs Microsecond
3GPP Third Generation Partnership Project
5G Fifth Generation
ABS Almost Blank Subframe
ASA Authorized Shared Access
ASIC Application Specific Integrated Circuit
CA Carrier Aggregation
CBRS Citizen Broadband Radio Service
CBSD Citizen Broadband Radio Service Device
CC Component Carrier
CCA Clear Channel Assessment
CFI Control Format Indicator
CN Core Network
CPU Central Processing Unit
CRS Cell-Specific Reference Symbol
CSI-RS Channel State Information Reference Signal
CW Contention Window
dB Decibel
dBm Decibel-Milliwatt
DFT Discrete Fourier Transform
DL Downlink
DMRS Demodulation Reference Signal
DRS Discovery Reference Signal
eIMTA Enhanced Interference Mitigation and Traffic Adaptation
eNB Enhanced or Evolved Node B
ESC Environmental Sensing Component
FCC Federal Communications Commission
FDMA Frequency Division Multiple Access
FPGA Field Programmable Gate Array
FSS Fixed Satellite Service
GAA General Authorized Access
GHz Gigahertz
HARQ Hybrid Automatic Repeat Request
LAA License Assisted Access
LBT Listen-Before-Talk
LSA License Shared Access
LTE Long Term Evolution
MBSFN Multicast-Broadcast Single Frequency Network
MF MulteFire
MHz Megahertz
MIB Master Information Block
MME Mobility Management Entity
ms Millisecond
MTC Machine Type Communication
NACK Negative Acknowledgement
OFDM Orthogonal Frequency Division Multiplexing
PAL Priority Access License
PCell Primary Cell
PDN Packet Data Network
P-GW Packet Data Network Gateway
PRACH Physical Random Access Channel
PRS Positioning Reference Signal
PUCCH Physical Uplink Control Channel
PUSCH Physical Uplink Shared Channel
RAT Radio Access Technology
Rel Release
RSRP Reference Signal Received Power
RSRQ Reference Signal Received Quality
RSSI Received Signal Strength Indicator
SAS Spectrum Access System
SCEF Service Capability Exposure Function
SCell Secondary Cell
SC-FDMA Single Carrier Frequency Division Multiple Access
SFN System Frame Number
SIB System Information Block
SRS Sounding Reference Signal
STA Station
TDD Time Division Duplexing
UE User Equipment
UL Uplink Those skilled in the art will recognize improvements and modifications to the embodiments of the present disclosure. All such improvements and modifications are considered within the scope of the concepts disclosed herein and the claims that follow.

What is claimed is:

1. A method of operation of an Authorized Shared Access, ASA, controller to provide parameter coordination for base stations and wireless devices operating on shared or adjacent channels, comprising:
configuring one or more parameters used by at least one base station and/or at least one wireless device operating on shared or adjacent channels, the one or more parameters comprising:
one or more parameters related to timing of downlink transmissions by the at least one base station and/or timing of uplink transmissions by the at least one wireless device;
one or more parameters related to Carrier Aggregation, CA;
one or more parameters related to downlink and/or uplink transmissions within base stations sharing the same or adjacent frequency channels;
one or more parameters related to different downlink and/or uplink reference signal parameters for different base stations;
one or more random access channel parameters; and/or
one or more parameters related to configuring System Information Block, SIB, and Master Information Block, MIB, parameters for adjacent base stations,
wherein the one or more parameters related to timing of downlink transmissions by the at least one base station and/or timing of uplink transmissions by the at least one wireless device comprise maximum durations of downlink and uplink transmission bursts that can be used by the at least one base station.

2. The method of claim 1 wherein the at least one base station comprises at least one of a group consisting of:
a Long Term Evolution, LTE, enhanced or evolved Node B, eNB;
a MulteFire eNB; and
a License Assisted Access, LAA, eNB.

3. The method of claim 1 wherein the one or more parameters related to timing of downlink transmissions by the at least one base station and/or timing of uplink transmissions by the at least one wireless device comprise:
a minimum backoff or idle period between consecutive transmission bursts from the at least one base station;
a parameter related to the occurrence in time and/or time offsets of downlink and/or uplink transmissions;
a parameter related to channel sensing;
a set of Multicast-Broadcast Single Frequency Network, MBSFN, subframe configurations for the at least one base station;
an allocation of almost blank subframes for inter-cell time-domain interference coordination;
a restriction on subframes to be used for downlink only;
a restriction on subframes to be used for uplink only; and/or
a restriction on subframes to be unused.

4. The method of claim 1 wherein the one or more parameters related to timing of downlink transmissions by the at least one base station and/or timing of uplink transmissions by the at least one wireless device comprise a parameter related to channel sensing, and the parameter related to channel sensing comprises an assignment of a particular channel as performing Listen-Before-Talk, LBT, with full random backoff prior to transmission.

5. The method of claim 1 wherein the one or more parameters related to timing of downlink transmissions by the at least one base station and/or timing of uplink transmissions by the at least one wireless device comprise a parameter related to channel sensing, and the parameter related to channel sensing comprises an assignment of a particular channel as performing a Clear Channel Assessment, CCA, prior to transmission.

6. The method of claim 1 wherein the one or more parameters comprise one or more parameters related to CA.

7. The method of claim 6 wherein the one or more parameters related to CA comprise:
a maximum number of simultaneously activated downlink Component Carriers, CCs, that the at least one base station can use when adopting downlink CA in an unlicensed frequency spectrum;
a maximum number of simultaneously activated uplink CCs that the at least one wireless device can use when adopting uplink CA in an unlicensed frequency spectrum;
one or more parameters that configure whether the at least one base station and/or the at least one wireless device is allowed to dynamically vary their transmit power allocation across CCs that are available for transmission after LBT;
one or more parameters that configure a degree to which the at least one base station and/or the at least one wireless device is allowed to dynamically vary their transmit power allocation across CCs that are available for transmission after LBT;
one or more parameters that configure a maximum allowed uplink transmit power on each serving cell when transmitting simultaneous Physical Uplink Shared Channel, PUSCH, and Physical Uplink Control Channel, PUCCH, or simultaneous PUSCH on multiple uplink CCs;
one or more parameters related to schedules for changing uplink and downlink configurations in a certain CC or CCs;
one or more parameters related to mobility and base station association for different CCs;
one or more parameters related to configuring cell range expansion offsets for different cells; and/or
one or more cell association parameters.

8. The method of claim 1 wherein the one or more parameters comprise one or more different parameters related to downlink and/or uplink transmissions within base stations sharing the same or adjacent frequency channels.

9. The method of claim 1 wherein the one or more parameters comprise one or more parameters related to different downlink and/or uplink reference signal parameters for different base stations.

10. The method of claim 1 wherein the one or more parameters define one or more non-overlapping sets of reference signals.

11. The method of claim 10 wherein the one or more overlapping sets of reference signals comprise:
Demodulation Reference Signal, DMRS, sequence groups;
Channel State Information Reference Signal, CSI-RS, configurations;
different time and/or frequency offsets and/or periodicities Cell Specific Reference Signals, CRSs, and/or Positioning Reference Signals, PRSs; and/or different time locations and/or multiplexing configurations for uplink Sounding Reference Signals, SRSs.

12. The method of claim 1 wherein the one or more parameters comprise one or more random access channel parameters.

13. The method of claim 12 wherein the one or more random access channel parameters comprise non-overlapping sets of Physical Random Access Channel, PRACH, configurations.

14. The method of claim 13 wherein the PRACH configurations comprise:

parameters relating to periodicities and valid subframes;

parameters relating to frequency offsets for PRACH resources within a subframe; and/or parameters allocating non-overlapping sets of PRACH preamble sequences.

15. The method of claim 1 wherein the one or more parameters comprise one or more parameters related to configuring SIB and/or MIB parameters for adjacent base stations.

16. The method of claim 15 wherein the one or more parameters related to configuring SIB and/or MIB parameters for adjacent base stations comprise:

different System Frame Number, SFN, periodicities and/or offsets for the subframes valid for transmission of MIB and/or SIBs;

physical cell identities; and/or timing and resource allocation for downlink preamble signals.

17. An Authorized Shared Access, ASA, controller operable to provide parameter coordination for base stations and wireless devices operating on shared or adjacent channels, the ASA controller comprising:

at least one network interface;

at least one processor; and memory storing instructions executable by the at least one processor whereby the ASA controller is operable to configure one or more parameters used by at least one base station and/or at least one wireless device operating on shared or adjacent channels, the one or more parameters comprising:

one or more parameters related to timing of downlink transmissions by the at least one base station and/or timing of uplink transmissions by the at least one wireless device;

one or more parameters related to Carrier Aggregation, CA;

one or more parameters related to downlink and/or uplink transmissions within base stations sharing the same or adjacent frequency channels;

one or more parameters related to different downlink and/or uplink reference signal parameters for different base stations;

one or more random access channel parameters; and/or one or more parameters related to configuring System Information Block, SIB, and Master Information Block, MIB, parameters for adjacent base stations, wherein the one or more parameters related to timing of downlink transmissions by the at least one base station and/or timing of uplink transmissions by the at least one wireless device comprise maximum durations of downlink and uplink transmission bursts that can be used by the at least one base station.

* * * * *